(12) United States Patent
Jenkin

(10) Patent No.: US 6,985,940 B1
(45) Date of Patent: Jan. 10, 2006

(54) PERFORMANCE TESTING OF SERVER SYSTEMS

(75) Inventor: Brian Garry Jenkin, Wellington (NZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,645

(22) Filed: Nov. 12, 1999

(51) Int. Cl.
G06F 15/173 (2006.01)
G06F 15/16 (2006.01)
G06F 13/10 (2006.01)
G06F 9/44 (2006.01)

(52) U.S. Cl. ............ 709/224; 709/226; 709/229; 709/223; 717/134; 703/21; 703/24

(58) Field of Classification Search ........ 709/223–226, 709/229–235; 717/134; 702/186; 703/21
See application file for complete search history.

(56) References Cited

U.S. PATENT DOCUMENTS

| | | | |
|---|---|---|---|
| 5,790,425 A * | 8/1998 | Wagle | 709/218 |
| 5,812,780 A * | 9/1998 | Chen et al. | 709/224 |
| 5,819,033 A * | 10/1998 | Caccavale | 709/224 |
| 5,819,066 A | 10/1998 | Bromberg et al. | |
| 5,905,868 A * | 5/1999 | Baghai et al. | 709/224 |
| 5,948,065 A * | 9/1999 | Eilert et al. | 709/224 |
| 5,958,009 A * | 9/1999 | Friedrich et al. | 709/224 |
| 6,003,083 A * | 12/1999 | Davies et al. | 709/226 |
| 6,041,352 A * | 3/2000 | Burdick et al. | 709/224 |
| 6,141,759 A * | 10/2000 | Braddy | 713/201 |
| 6,243,761 B1 * | 6/2001 | Mogul et al. | 709/246 |
| 6,271,845 B1 * | 8/2001 | Richardson | 345/764 |
| 6,311,296 B1 * | 10/2001 | Congdon | 714/56 |
| 6,339,750 B1 * | 1/2002 | Hoyer et al. | 709/224 |
| 6,363,477 B1 * | 3/2002 | Fletcher et al. | 713/151 |
| 6,434,513 B1 * | 8/2002 | Sherman et al. | 702/186 |
| 6,446,028 B1 * | 9/2002 | Wang | 702/186 |
| 6,446,120 B1 * | 9/2002 | Dantressangle | 709/224 |
| 6,467,052 B1 * | 10/2002 | Kaler et al. | 714/39 |
| 6,545,979 B1 * | 4/2003 | Poulin | 370/241.1 |
| 2001/0049727 A1 * | 12/2001 | Mukherjee et al. | 709/219 |

FOREIGN PATENT DOCUMENTS

| | | |
|---|---|---|
| JP | PUPA62-285546 | 12/1987 |
| JP | PUPA62-298252 | 12/1987 |

(Continued)

OTHER PUBLICATIONS

Sohn et al, Performance Measurements of a Small-Scale VOD Server based on the UNIX, 1998, IEEE, 0-7803-4468-5/98, pp. 206-206.*

Primary Examiner—Ario Etienne
(74) Attorney, Agent, or Firm—Anthony V. S. England; T. Rad Coca

(57) ABSTRACT

A method for testing server machine performance is described. A client-emulating server machine has a collection of live data maps for a plurality of transactions for a chosen computing application. A server is in communication with the workstation. The workstation transmits a processing load, including a plurality of the maps for the plurality of transactions, to the server as it executes the computing load. The server measures one or more performance criteria as it executes the load. The performance criteria can include the average response time for a transaction within a load, and the proportion of server CPU time taken by each transaction of the load. By varying the processing load generated by the workstation and assessing the measured performance criteria, it is possible to determine whether the server has satisfactory capacity.

16 Claims, 4 Drawing Sheets

FOREIGN PATENT DOCUMENTS

| | | |
|---|---|---|
| JP | PUPA64-25246 | 1/1989 |
| JP | PUPA02-141835 | 5/1990 |
| JP | PUPA03-147044 | 6/1991 |
| JP | PUPA05-95376 | 4/1993 |
| JP | PUPA06-188916 | 7/1994 |
| JP | 06314306 A | 11/1994 |
| JP | PUPA07-79222 | 3/1995 |
| JP | 08331161 A | 12/1996 |
| JP | 10187595 A | 7/1998 |
| JP | PUPA10-187495 | 7/1998 |

* cited by examiner

PERFORMANCE TESTING OF SERVER SYSTEMS

FIELD OF THE INVENTION

This invention relates to client-server computing environments, in which one or more server machines execute requests issued by, typically, a large number of client machines. The invention relates particularly to performance testing of servers for the purpose of determining whether design and/or operational criteria are met. This leads to a determination of the adequacy of sizing of a server.

BACKGROUND OF THE INVENTION

In modern scalable computing systems a common topology has three (logical and/or physical) tiers: (i) a presentation tier characterised by multiple workstations focusing on user interactions, (ii) a business tier characterised by multiple servers executing application/business logic, (iii) a data tier characterised by multiple databases working on data storage and organization. The physical systems are interconnected by a communications network, examples being Local or Wide Area Networks (LAN/WAN).

Such computing systems find application in many and varied fields, ranging from university research and teaching facilities to business applications. In fact, almost every business will utilise such a system to transact its functions and serve its clients. For example, a system may be used to control inventory, for image processing and accounts purposes, and for servicing client's enquiries. Many businesses have very large client bases and may provide an extensive inventory of goods and services. One illustrative example is a telecommunications service provider (Telco) that serves a countrywide client base. The Telco's subscribers thus can number in the millions, and each customer will expect a near immediate response from a Customer Service Representative (CSR) to any inquiry, which can range from billing information, a request for a new service, or the placing of orders for a product.

Similar examples are seen in Utilities, insurance companies, banks, hospitals, law firms, accountancy firms, stock exchanges, universities and Government agencies, to name but a few.

In the course of developing large-scale client server computing systems, an important part of the design process is to determine whether performance criteria such as (i) the average response time of a nominated transaction, and (ii) the proportion of CPU time (Client, Server or Database) taken by a nominated transaction, are met. These determinations can lead to the conclusion that the computing hardware is correctly sized.

A known technique of performance testing is termed 'stress testing' or 'Benchmarking', by which simulated transaction records are 'fed' to the server computer, and as that loading is increased, performance criteria are measured.

Two specific examples of stress testing known in the prior art are disclosed in Published Japanese Application No. 10-187495 (NEC Corp), entitled "Method and Device for Evaluating High-load Emulation Performance", and in U.S. Pat. No. 5,790,425 (Wagle, assigned to Sun Microsystems, Inc.), issued on Aug. 4, 1998, entitled "Generic Server Benchmarking Framework in Client Server Environment". Both of these prior art documents offer only an approximation of actual loading due to execution of the live application.

It is an object of the invention to at least address this shortcoming.

SUMMARY OF THE INVENTION

The invention provides a method for testing server performance, comprising the steps of:
 (a) forming a collection of live maps for a plurality of transactions for a chosen computing application;
 (b) transmitting a processing load, constituted by a plurality of said maps for a plurality of said transactions, to a server running said computing application; and
 (c) measuring one or more performance criteria for said server as it executes said load.

The invention further provides a method for testing server performance, comprising the steps of:
 (a) forming a collection of live maps for a plurality of transactions for a chosen computing application;
 (b) transmitting a processing load, constituted by a plurality of said maps for a plurality of transactions, from a workstation to a server running said computing application;
 (c) for each transaction within said load, returning a result to said workstation; and
 (d) measuring, at said workstation, one or more performance criteria based on execution of said load by said server.

The processing load can be varied by making changes to the number of maps and the mix of transactions transmitted to the server. The measurements of the performance criteria will be repeated for each individual processing load. The measured performance criteria can be compared against predetermined performance measures to determine whether the server's capacity is satisfactory. The performance criteria can include the average response time for a transaction within a load, and the proportion of the server CPU time taken by each transaction of the load. The performance criteria can be compared against predetermined stored performance measures to determine whether server capacity is satisfactory. The performance criteria measurement can be performed on the workstation, as opposed to the server. Further, the server can have connection to one or more database servers that execute portions of the load transactions. The performance criteria can be end-to-end, namely from workstation to server to database server.

BRIEF DESCRIPTION OF THE DRAWINGS

Embodiments of the invention will now be described with reference to the accompanying drawings, in which.

DESCRIPTION OF PREFERRED EMBODIMENTS AND BEST MODE

Figure 1:
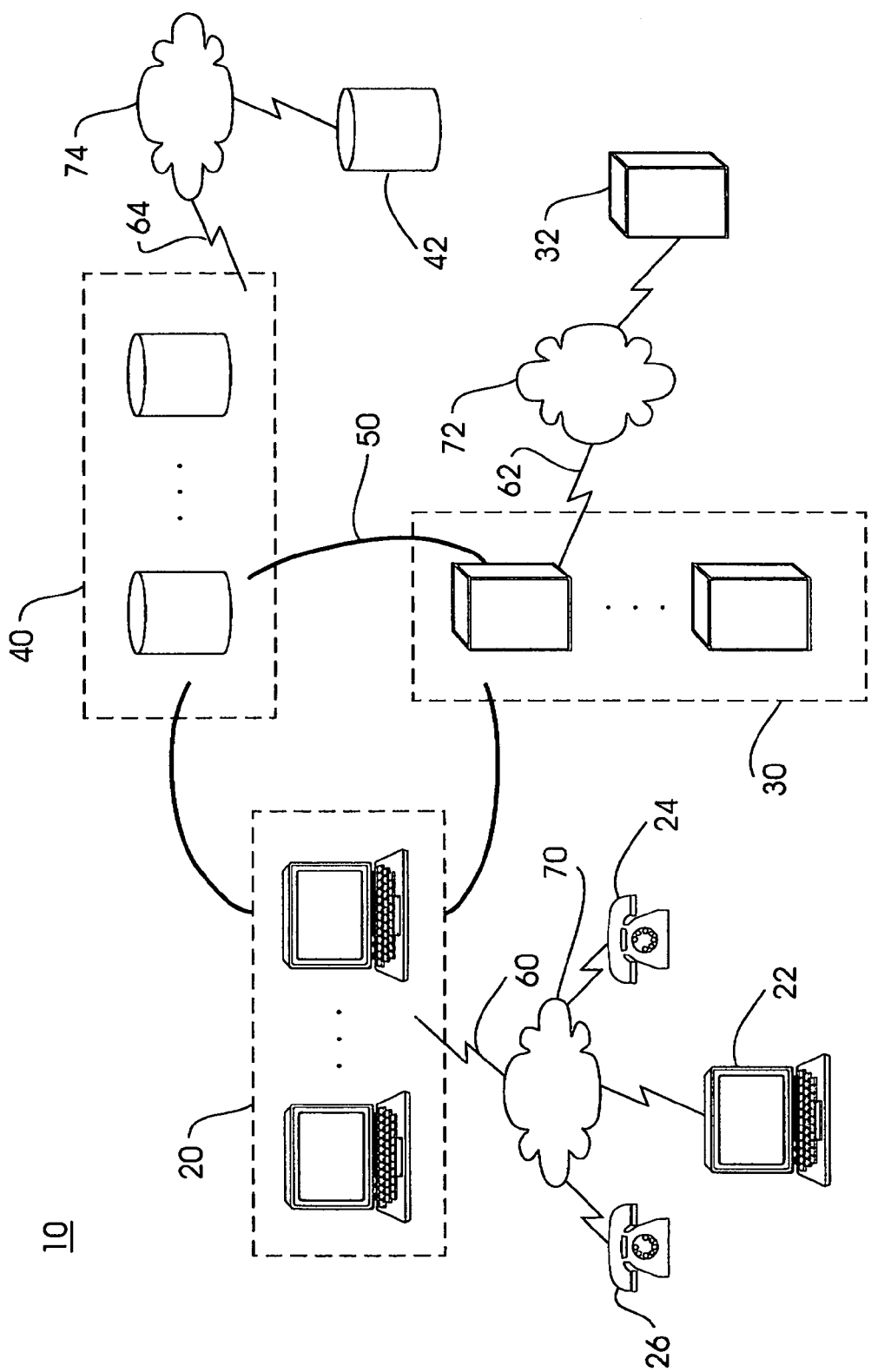
FIG. 1 is a representative topology of a three tier computing system.

FIG. 1 is a representative topology of a three tier computing system 10 embodying the invention. The presentation (or client/user) tier is represented by a number (1 . . . n) of workstations 20, that can be appropriate computing terminals, for example personal computers. The business tier is represented by a number (1 . . . p) of servers 30, that can be dedicated mini or mainframe computers. The data tier is represented by a number (1 . . . m) of database servers 40, which can include dynamically managed magnetic or optical storage media.

The computing system 10 is of an 'open' design, providing communication links 60, 62, 64, via external networks 70, 72, 74 to like-devices 22, 32, 42 and remote telephone terminals 24, 26.

The workstations 20, servers 30, and databases 40 are interconnected by a Local or Wide Area Network (LAN or WAN) 50. The LAN/WAN 50 carries information passing between each of the three basic elements described.

Client/Server systems such as shown in FIG. 1 find industrial application in the fields noted in the foregoing Background section. For the purposes of a non-limiting illustration, consider the example of a Telcom operating across many States of the United States. Such a Telcom will typically support local, regional, interstate and international voice and data calls, as well as cellular mobile voice and data traffic. Customers of the Telco can choose from a wide range of goods and services including, for example, the installation of second phone/fax/Internet lines, call forwarding, and messaging. They also will expect to be able to make enquiries of CSRs stationed at the workstations 20 concerning billing and service faults. It is not unreasonable to expect a modern-day Telco to have at least 1 million customers, typically requiring at least 500 CSRs. A Telco system infrastructure of this size can expect to handle about 15,000 business transactions per hour. Depending on the business function being used, the CSR will interact with the system one or more times. Each client/server interaction may require few to many database interactions (reading or writing to the physical database).

To give a better example of the size of computing hardware required to achieve such performance, the CSR workstations 20 could be Pentium™ personal computers running the Windows NT™ operating system, the servers 30 can be one or more IBM UNIX™-based 12-way RS6000™ S-70 machines, and the databases would require a capacity of about 40 Gbytes, managed by an Oracle™ or IBM DB-2™ system. There would, of course, be other operational LAN/WAN servers required to handle data communications, as would be readily understood by a person skilled in the art.

Because of the very large hardware commitment, and expense, in such client/server systems, it is important that the correct sizing is achieved, in the sense that the hardware is neither two large nor too small to achieve the desired performance characteristics.

Figure 2:
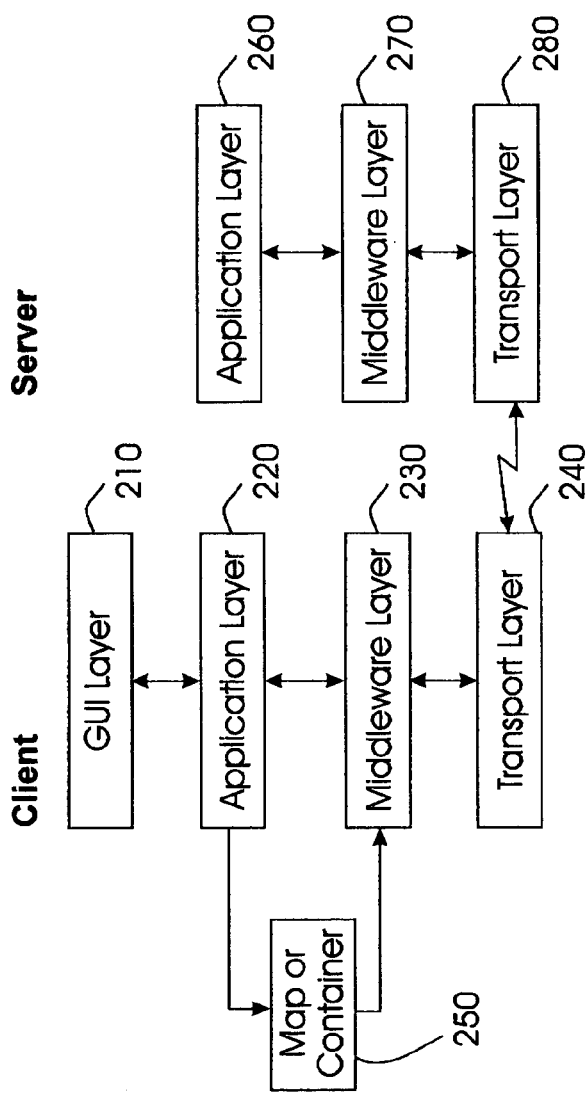
FIG. 2 is a generalised software architecture for a client-server environment.

FIG. 2 is a generalised software architecture for a client-server environment. On the client machine, a Graphical User Interface (GUI) layer 210 provides the human-machine interface for a user. The GUI layer 210 interfaces with an application layer 220, where the specific computing operation or purpose performed by the client-server system resides. The application layer 220 interfaces with a middleware layer 230 that handles system aspects such as system resource usage, operating system locks, shared memory access, container services, queuing Services, transaction Services, logical unit of work coordination, inter-process communications, user access control services and configuration retrieval services. As shown, application data, packaged into "maps" or "containers" 250, is passed to the middleware layer 230. The middleware layer 230 represents the operating system and communications services. The transport layer 240 of the client machine is in network communication with the server machine. The server machine replicates the layers 240, 230 and 220, providing a replica transport layer 280, replica middleware layer 270, and replica application layer 260, and functions thereof.

Figure 3:
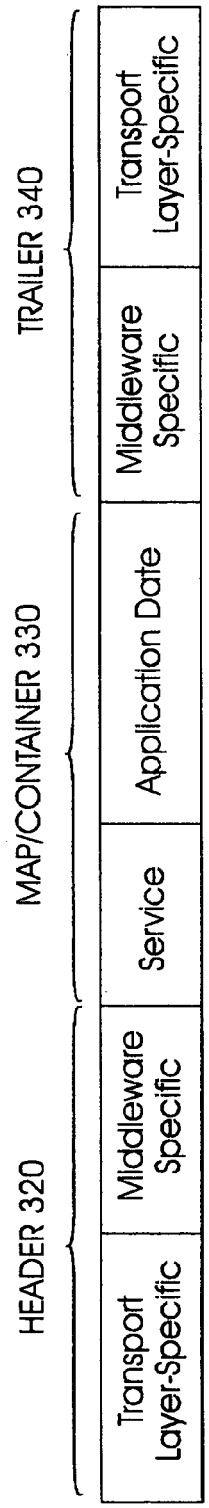
FIG. 3 shows a representative transport layer package passed between client and server.

The content of a map/container 250 includes the identification of the "service" which the server machine application is to execute, together with the application data which is required by the particular application process. FIG. 3 shows a representative data packet 310 having header information 320 specific to the transport and middleware layers 240 and 230 (FIG. 2). Optionally, there can be similar trailer information 340. The maps/container content 330 comprises the services information and application data.

For a computing system as shown in FIG. 1, there can be many and varied configurations, however it is common for there to be a large number of client workstations 20, loading one or more application servers 30. In the performance (or stress) testing environment, it is common for the plurality of client machines to be emulated by a single larger-scale server machine.

Figure 4A:
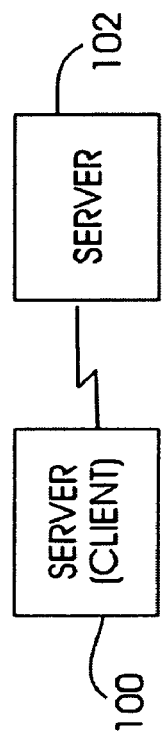
FIGS. 4a and 4b show topographies of stress testing systems.

FIG. 4A shows an example of a server machine 100, emulating a client machine, in networked connection with a server machine 102 that is to be stress-tested.

Figure 4B:
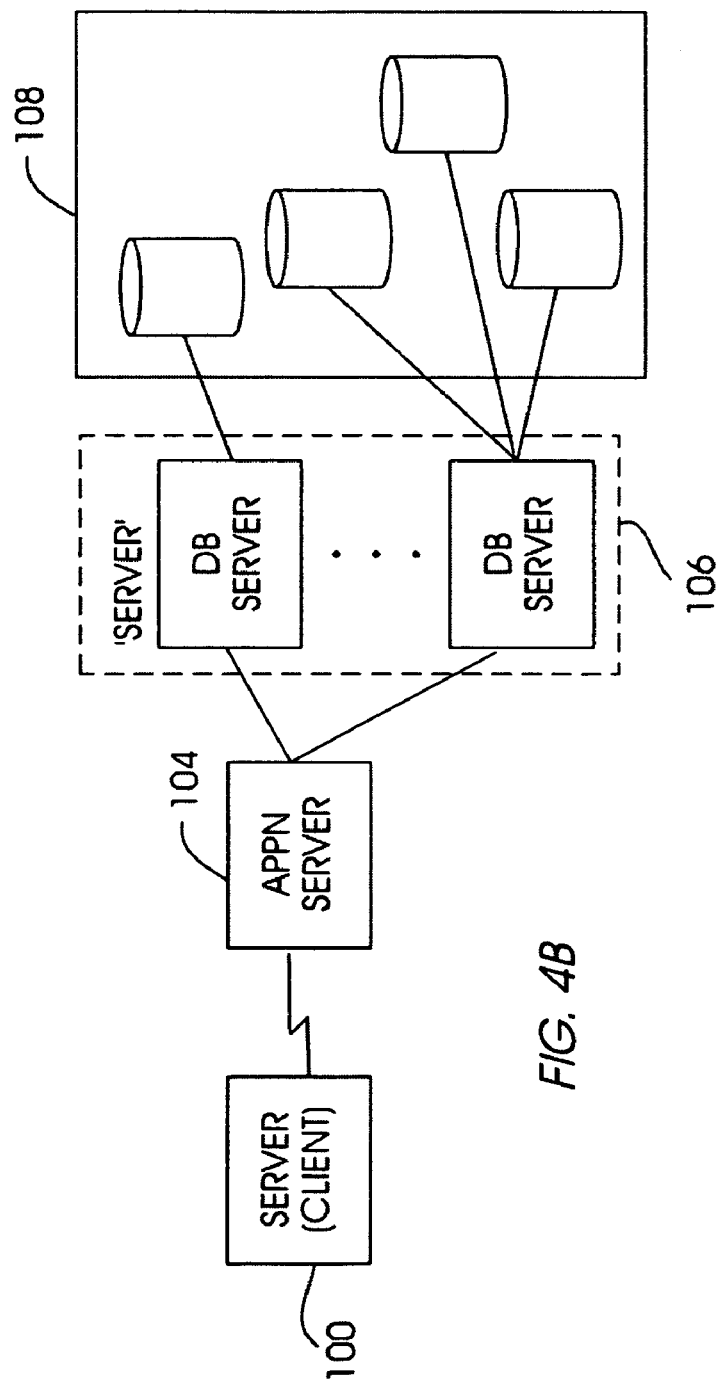

FIG. 4b shows the same server machine 100 emulating a client machine, however the 'server' to be tested includes a front-end application server 104 having connection to a plurality of database servers 106, in turn connected with data stores 108. The method of the invention is applicable to the arrangement of FIG. 4a and FIG. 4b, and other variations.

The methodology of the service performance testing includes the following (non-limiting) broad steps:
  (i) The live maps/containers for a plurality of transactions for a chosen application must firstly be collected. By "live" is meant actual transactions, as opposed to simulations.
  (ii) The collection of containers is stored within the client emulation server.
  (iii) A processing load is transmitted from the emulation server to the server under test, and the selected performance criteria are measured as the server executes the load.
  (iv) The processing load is varied, both in terms of the total number of transactions and the transaction type (or mix), that is transmitted to the server.
  (v) The performance criteria can be utilised to determine whether the sizing of the server meets intended design parameters.

Figure 5:
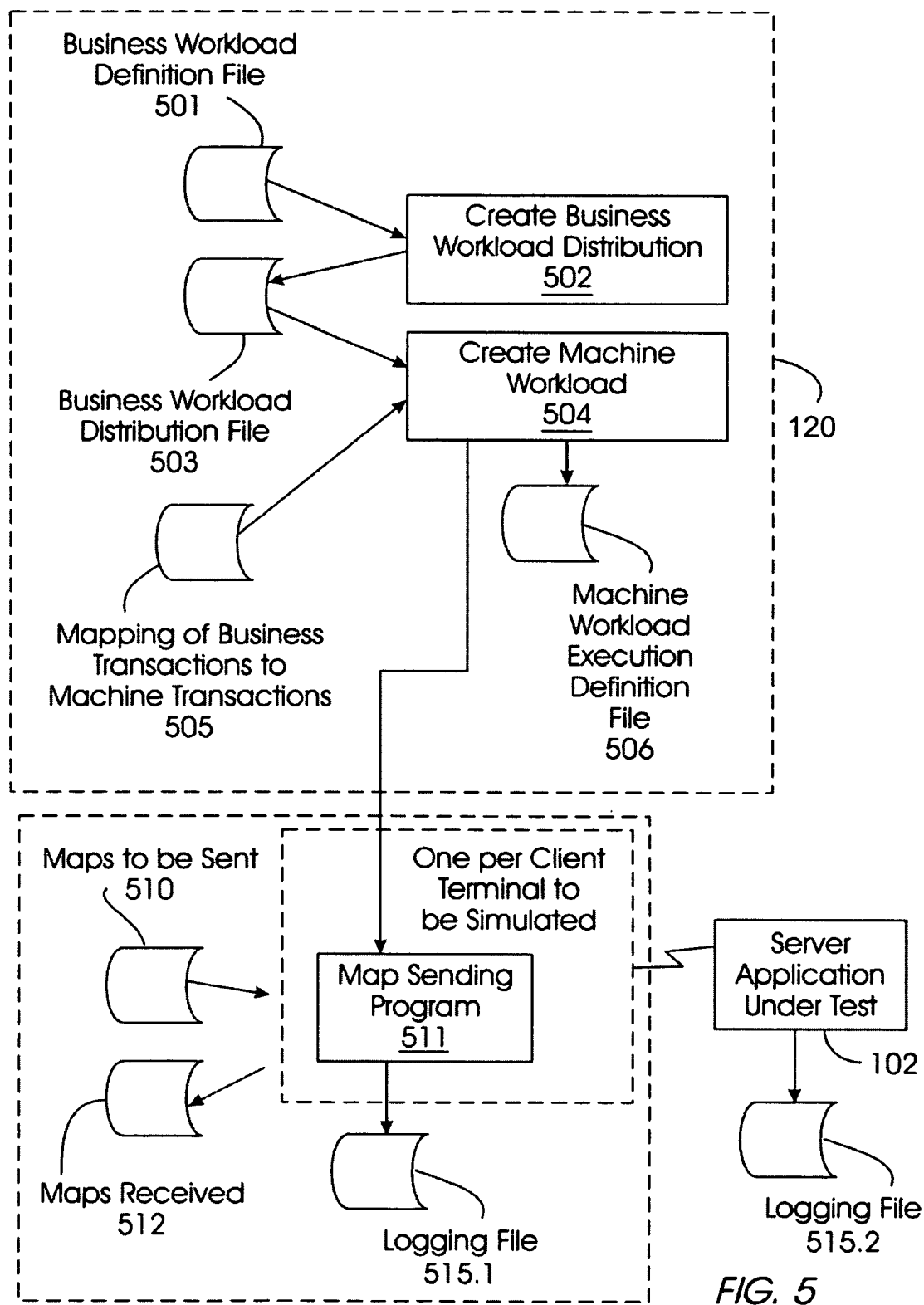
FIG. 5 shows the software elements created to implement performance testing.

FIG. 5 shows the software elements that are created to implement performance testing in the terms described above. The files are delimited by those created in advance of the performance testing (i.e. pre-runtime), represented by numeral 120, and those elements that are utilised in the course of the performance testing, represented by the numeral 122.

In the pre-runtime 120, a Business Workload Definition File 501 is created and populated, creating 502 a Business Workload Distribution File 503. This file 503 and a Mapping File 505 (mapping Business Transactions To Machine Transactions 505) are merged to create 504 the machine workload, resulting in a Machine Workload Execution Definition File 506. In the run-time 122, the pre-stored Live Maps 510 are selectively read by a Map Sending Program 511 which executes the Workload Execution File 506 to place the process load onto the server 102 running the application under test. The Map Sending Program 511 is replicated: one per client machine being simulated. The server 102 under test executes the requested load and returns a reply map. Such reply maps are stored on the emulated client machine in the Maps Received File 512. It is necessary for the Business Workload Definition File 501 and the Mapping File 503 to relate to the same application that is being run by the server 102 under test. In the same way, the stored maps in the Maps Received File 512 must relate to the same server application.

The performance criteria, such as the average response time of a transaction or the proportion of CPU time taken by a transaction, can be determined by the server under test 102 itself, or can be determined on the client emulation server (to include the communications link performance). Whichever way, the results of the performance testing are stored in a Logging File 515.1 on the client emulation server or on the server under test Logging File 515.2.

An example of the Business Workload Definition File 501, for a Telco customer inquiry and ordering system (such as generally described above) is as follows:

| EQ | 79 | Enquiries |
|---|---|---|
| EA | 21 | Account enquiries |
| ES | 10 | Statement enquiries |
| EG | 21 | General enquiries |
| ET | 34 | Toll enquires |
| EL | 14 | Calling card |

The first line represents that, of the total workload, 79% is occupied by "Enquiries". The following rows specify the sub-type of enquiries within that 79%. For example, an Account enquiry represents 21% of the total enquiries, while the total enquiries are 79% of the total workload.

An example of the file 505 which maps Business Transactions (of sub-type DA) to a sequence of maps to be executed is as follows:

```
*           The Master Workload Detail file
*SubTyp DA          (The particular subtype being defined
*           (A sequence of individual maps to execute
*               vgrous03
*               vgrous04
*               vgrprd06
*               vgprd06
*               vgracc01
*               vgracc03
[vgracc63, 1; vgracc61, 1; vgracc53, 1;] (Name, relative probability
```

An example of Machine Workload Execution Definition File 506 is as follows:

| *Execution Script for build56. Script. T1 | | | |
|---|---|---|---|
| * | Subtype = EA | | |
| VGRACC38 | VC38 | I.VGRACC38. | XXX. 060 |
| VGRACCNO | VCNO | I.VGRACCNO. | XXX. 035 |
| VGRPRPDF | VTDP | I.VGRPRPDF. | XXX. 005 |
| VGRPRP06 | VP06 | I.VGRPRD06. | XXX. 064 |
| VGRACC01 | VC01 | I.VGRACC01. | XXX. 068 |
| VGRACC65 | VC65 | I.VGRACC65. | XXX. 026 |
| * | Subytpe = EA | | |
| VGRACC38 | VC38. | I.VGRACC38. | XXX 060 |
| VGRACCNO | VCNO | I.VGRACCNO. | XXX. 004 |
| VGRPRPDF | VTPD | I.VGRPRPDF. | XXX 065 |
| VGRPRD06 | VT06 | I.VGRPRD06. | XXX. 015 |
| VGRACC01 | VC0 | I.VGRACC01. | XXX. 042 |

| *Execution Script for build56. Script. T1 | | | |
|---|---|---|---|
| VGRACC69 | VC69 | I.VGRACC69. | XXX. 032 |
| * | Subtype = EG | | |
| VGRACC38 | VC38. | I.VGRACC38. | XXX. 003 |
| VGRACCNO | VCNO | I.VGRACCNO. | XXX. 013 |
| VGRPRPF | VTPD | I. VGRPRPF. | XXX. 116 |
| VGRPRD06 | VT06 | I.VGRPRD06. | XXX. 069 |
| VGRACC01 | VC01 | I.VGRACC01. | XXX. 096 |

The third field is the name of the specific map file.

Example

Referring again to FIG. 2, as examples of implementations for the middleware layers 230 include the IBM CICS™ or ENCNIA™ systems. In relation to the transport layer 240, examples of implementations are either TCP/IP or SNA. Any convenient physical layer network can be utilized, such as a token passing LAN. The application layer 220 must have the capability, either inherently or by specific coding, to create or write live maps.

The measurements shown below ere performed on a single node (model 595) of an RS/6000 SP 2 system.

The Business Workload Distribution file was of a similar composition to that shown above. The client emulating server machine also was an RS/6000 machine. The performance metric was to determine the maximum CICS throughput rate for the specified enquiry workload. Workload was increased in the increments of two, three, four and six simulated terminals, with the response time being calculated for each transaction.

The following table represents the individual transactions for the case of "end time", the second column represents the discrete individual "transactions", the third column shows the "start time", and the fourth column shows the overall response time.

```
11/26/98, 15:23:01, i.VGRACCNO.xxx.059, 15:23:00, 0.94499345
11/26/98, 15:23:02, i.VGRPRPDF.xxx.065, 15:23:01, 1.52325305
11/26/98, 15:23:03, i.VGRPRD06.xxx.007, 15:23:02, 0.73049395
11/26/98, 15:23:04, i.VGRPRD06.xxx.091, 15:23:03, 1.096042
11/26/98, 15:23:07, i.VGRACC01.xxx.042, 15:23:04, 3.0945521
11/26/98, 15:23:09, i.VGRACC05.xxx.019, 15:23:07, 2.28059385
11/26/98, 15:23:13, i.VGRACC38.xxx.012, 15:23:09, 3.57596095
11/26/98, 15:23:14, i.VGRACCNO.xxx.114, 15:23:13, 0.59853705
11/26/98, 15:23:15, i.VGRPRPDF.xxx.005, 15:23:14, 1.61760075
                                .
                                .
11/26/98, 15:28:34, i.VGRACCNO.xxx.013, 15:28:34, 0.4899564
11/26/98, 15:28:34, i.VGRPRPDF.xxx.014, 15:28:34, 0.43951875
11/26/98, 15:28:35, i.VGRPRD06.xxx.064, 15:28:35, 0.33546205
11/26/98, 15:28:35, i.VGRPRD06.xxx.007, 15:28:35, 0.41166125
11/26/98, 15:28:37, i.VGRACC01.xxx.042, 15:28:35, 1.8305234
11/26/98, 15:28:38, i.VGRACC05.xxx.098, 15:28:37, 1.0756061
11/26/98, 15:28:40, i.VGRACC38.xxx.087, 15:28:38, 1.6714174
11/26/98, 15:28:40, i.VGRACCNO.xxx.013, 15:28:40, 0.298258
11/26/98, 15:28:41, i.VGRPRPDF.xxx.065, 15:28:40, 0.94981075
11/26/98, 15:28:42, i.VGRPRD06.xxx.015, 15:28:41, 0.5698334
11/26/98, 15:28:44, i.VGRACC01.xxx.042, 15:28:42, 2.63401085
11/26/98, 15:28:46, i.VGRACC38.xxx.060, 15:28:44, 1.13616375
11/26/98, 15:28:46, i.VGRACCNO.xxx.013, 15:28:46, 0.4442817
11/26/98, 15:28:47, i.VGRPRPDF.xxx.065, 15:28:46, 0.7981063
11/26/98, 15:28:47, i.VGRPRD06.xxx.091, 15:28:47, 0.4851278
11/26/98, 15:28:48, i.VGRPRD06.xxx.069, 15:28:47, 0.49962255
11/26/98, 15:28:49, i.VGRACC01.xxx.068, 15:28:48, 1.5193212
11/26/98, 15:28:51, i.VGRACC05.xxx.019, 15:28:49, 1.1684261
11/26/98, 15:28:52, i.VGRACC38.xxx.012, 15:28:51, 1.72167155
```

-continued

```
11/26/98, 15:28:53, i.VGRACCNO.xxx.059, 15:28:52, 0.62635305
11/26/98, 15:28:55, i.VGRPRPDF.xxx.014, 15:28:53, 2.46022115
11/26/98, 15:28:56, i.VGRPRD06.xxx.007, 15:28:55, 0.3547103
11/26/98, 15:28:57, i.VGRACC01.xxx.016, 15:28:56, 1.07111495
11/26/98, 15:28:58, i.VGRACC63.xxx.110, 15:28:57, 0.7502934
11/26/98, 15:28:59, i.VGRACC38.xxx.087, 15:28:58, 1.04842535
11/26/98, 15:28:59, i.VGRACCNO.xxx.029, 15:28:59, 0.444598
11/26/98, 15:29:00, i.VGRPRPDF.xxx.005, 15:28:59, 0.6602939
11/26/98, 15:29:00, i.VGRPRD06.xxx.064, 15:29:00, 0.3538677
11/26/98, 15:29:01, i.VGRACC01.xxx.096, 15:29:00, 1.05042975
```

The following table summarises the performance testing, where the first column represents the number of terminals, and the second column represents the number of transactions per second.

| Terminals | Trans/sec | Comments |
|---|---|---|
| 2 | 5.8 | |
| 3 | 6.1 | |
| 4 | 7.2 | |
| 6 | 4.8 | Blocking on I/O write |
| 4 | 9 | |
| 11 | 7.75 | Blocking again |

When the number of terminals is increased to six, the reduction in the throughput indicated that there was blocking on the I/O writing, and an appropriate adjustment was made, namely the parameter 'CisTimeMode' was set to 0. With this change made, four terminals were simulated, then eleven. The reduction in the number of transactions per second indicates the existence of another bottleneck. This led to the suggestion that there is insufficient memory on the server machine to handle the load generated by eleven client machines.

The example presented increased the number of terminals, while maintaining the Workload Execution Definition file as constant. It is equally possible to hold the number of terminals fixed and increase the number and mix of transactions.

One advantage of the invention is that the GUI layer (see FIG. 2) format can be changed and yet there would be no requirement to re-record the set of live maps.

It will be understood that the scope of the invention fully encompasses other embodiments which may become obvious to those skilled in the art, and that the scope of the present invention is accordingly to be limited by nothing other than the appended claims.

I claim:

1. A method for testing performance of a server running a chosen computing application, the method comprising the steps of:
   (a) emulating a a plurality of individual client computing stations by a client emulation server, wherein a computing operation performed by such an emulated client resides in an application layer that communicates with a middleware layer on the emulated client;
   (b) forming, on the client emulation server, a workload execution definition file referencing a first collection of a number of live maps, wherein such a live map includes i) identification of an application layer transaction for actual processing by a tested server running the chosen computing application, and ii) data for the chosen application, including data formed at the emulated client application layer, and wherein the chosen computing application of the transaction for such a live map is the same for each of the live maps in the collection;
   (c) passing the collection from such a client application layer to such a client middleware layer;
   (d) reading, in response to the workload execution definition file by a number X of instances of a map sender program running on the client emulation server, the first collection of live maps;
   (e) transmitting, a number of instances of the collection of live maps to the tested server as a processing load by the respective map sender program instances, so that the number of transmitted instances of the collection of live maps corresponds to the number X of instances of the map sender program;
   (f) measuring one or more performance criteria resulting from said tested server actually processing said load, wherein the measuring of the one or more performance criteria includes time stamping a record of such a live map for specific ones of the application layer transactions to determine server and network latency;
   (g) changing, by the client emulation server, the first collection of live maps and the number X of instances of map sender programs to a number Y, in order to selectively vary processing loads of the tested server, wherein the changing includes changing the number of said live maps and types of said transactions in the first collection of live maps;
   (h) reading the changed collection of live maps by the Y instances of the map sender program;
   (i) transmitting, by the Y instances of the map sender program, a next processing load from the client to the server, so that the next processing load includes Y instances of the changed collection of live maps; and
   (j) repeating said measuring step (f) for the next processing load.

2. The method of claim 1, comprising the further step of:
   (k) comparing said performance criteria against predetermined performance measures to determine whether said tested server has satisfactory capacity.

3. The method of claim 2, whereby said performance criteria include average response time for a transaction within such a load.

4. The method of claim 2, whereby said performance criteria include the proportion of tested server CPU time taken by a transaction of such a load.

5. The method of claim 1, wherein step (f) comprises, for each transaction within said load, returning a result to said client emulation server; and measuring, by said client emulation server or by said tested server, the one or more performance criteria responsive to the processing of said load by said tested server.

6. The method of claim 1, wherein in step (f) the time stamping of the record includes time stamping the record by the client emulation server before the transmitting of such a processing load to the tested server, and the measuring of one or more performance criteria includes receiving, by the client emulation server, a reply map for the live map from the tested server after the tested server processes the load, wherein the reply map includes tested server processing time measured by the tested server so that the client emulation server is able to compute elapsed time from a client perspective and compare ones of the client-perspective elapsed times to ones of the tested server processing times for specific ones of the application layer transactions to determine tested server and network latency.

7. A system for testing server performance, said system comprising:
- (a) a tested server running a chosen computing application;
- (b) a client emulation server for emulating a plurality of individual client computing stations, wherein a computing operation performed by such an emulated client resides in an application layer that communicates with a middleware layer on the emulated client, said client emulation server including a workload execution definition file referencing a first collection of a number of live maps, the live maps of the collection being passed from such an emulated client application layer to such an emulated client middleware layer, wherein such a live map includes i) identification of an application layer transaction for actual processing of the transactions by the tested server running the chosen computing application, and ii) data for the chosen application, including data formed at the emulated client application layer, and wherein the chosen computing application of the transaction for such a live map is the same for each of the live maps in the collection;
- (c) a communications connection between said client emulation server and said tested server; and
- (d) a number X of instances of a map sender program on the client emulation server, wherein the map sender program instances read the first collection of live maps in response to the workload execution definition file, and send, via said communications connection, respective instances of the first collection of live maps to the tested server as a processing load, so that the number of sent instances of the collection of live maps corresponds to the number X of instances of the map sender program;

wherein said tested server is operable to actually process said load and the system is operable to measure one or more performance criteria resulting from the tested server processing said load;

wherein the measuring of one or more performance criteria includes time stamping a record of such a live map so that elapsed times can be determined for specific ones of the application layer transactions to determine server and network latency; and wherein, in order to selectively vary processing loads of the tested server, said client emulation server is further operable to change the number X of instances of the map sender program to a number Y and change the first collection of live maps and transmit, by the Y map sender program instances, a next processing load to the tested server, the next processing load including Y instances of the changed collection of live maps, wherein the changing includes changing the number of said live maps and types of said transactions in the first collection of live maps, the server or client being operable to repeat the measuring for the next processing load.

8. The system of claim 7, wherein said tested server compares said measured performance criteria against predetermined performance measures to determine whether the tested server has satisfactory capacity.

9. The system of claim 8, wherein said tested server stores a file of said performance data measures.

10. The system of claim 9, wherein said client emulation server stores a file of said performance data measures.

11. The system of claim 8, wherein said performance data criteria includes the average response time for a transaction within one of said loads.

12. The system of claim 8, wherein said performance data criteria includes the proportion of tested server CPU time taken by such a transaction of said loads.

13. The system of claim 8, wherein said tested server has connection to one or more database servers, said database servers being operable to execute portions of said load transactions.

14. The system of claim 8, wherein said tested server comprises a plurality of servers, and each of said server plurality has connection to one or more database servers, said database servers being operable to execute portions of said load transactions.

15. The system of claim 7, said system comprising:
- at least one database in communication with said tested server.

16. The system of claim 7, wherein the time stamping of the record includes time stamping the record by the client emulation server before the transmitting of such a processing load to the tested server, and the measuring of one or more performance criteria includes receiving, by the client emulation server, a reply map for the live map from the tested server after the tested server processes the load, wherein the reply map includes tested server processing time measured by the tested server so that the client emulation server is able to compute elapsed time from a client perspective and compare ones of the client-perspective elapsed times to ones of the tested server processing times for specific ones of the application layer transactions to determine tested server and network latency.

* * * * *

UNITED STATES PATENT AND TRADEMARK OFFICE
CERTIFICATE OF CORRECTION

PATENT NO. : 6,985,940 B1
DATED : January 10, 2006
INVENTOR(S) : Grian Garry Jenkin It is certified that error appears in the above-identified patent and that said Letters Patent is hereby corrected as shown below:

<u>Column 6,</u>
Line 24, "The measurements shown below ere performed on a…" should read -- The measurements shown below were performed on a… --.

Signed and Sealed this

Eighteenth Day of April, 2006

JON W. DUDAS
*Director of the United States Patent and Trademark Office*